United States Patent [19]

Sarasin

[11] Patent Number: 4,970,797

[45] Date of Patent: Nov. 20, 1990

[54] MASON'S SCALE AND MASONRY GUIDE EMPLOYING SAID SCALE

[76] Inventor: Roy E. Sarasin, 43 Riverview Beach Road, Pefferlaw, Ontario L0E 1N0, Canada

[21] Appl. No.: 408,840

[22] Filed: Sep. 18, 1989

[51] Int. Cl.$^5$ .............................................. G01B 3/02
[52] U.S. Cl. ........................................ 33/494; 33/404; 33/407
[58] Field of Search ................. 33/494, 404, 406, 407, 33/408, 476, 518, 662, 663, 759

[56] References Cited

U.S. PATENT DOCUMENTS

| | | | |
|---|---|---|---|
| 1,693,227 | 11/1928 | Ellis | 33/494 |
| 2,140,714 | 12/1938 | Palmer | 33/494 |
| 2,575,077 | 11/1951 | Snyder | 33/759 |
| 2,761,214 | 9/1956 | Ruble | 33/406 |
| 3,250,010 | 5/1966 | Smith | 33/494 |
| 3,457,649 | 8/1966 | Rodgers | 33/404 |
| 4,845,858 | 7/1989 | Thomas | 33/494 |

FOREIGN PATENT DOCUMENTS

170006  6/1951  Austria .................................. 33/494

*Primary Examiner*—William A. Cuchlinski, Jr.
*Assistant Examiner*—Alvin Wirthlin
*Attorney, Agent, or Firm*—Arne I. Fors; D. Doak Horne

[57] ABSTRACT

A masons scale for use in laying courses of brick, adapted to allow a mason to calculate appropriate mortar thicknesses between rows of bricks when constructing a brick wall, so as to evenly space the rows of bricks in such wall. Such scale consists of a plurality of groups of mutually adjacent, individually colored bands arranged along a substantially elongate, flat surface, each group spaced a progressively decreasing distance apart from the next group progressing from bottom to top of the scale, the midpoint of each colored band spaced a uniform distance from the midpoint of a correspondingly colored band in an adjacent group of colored bands. A masonry guide incorporating such scale is also provided, further comprising an elongate post member, and bracket means affixed at each end of the post member, to allow the masonry guide and the associated scale to be affixed to the side of a structure in a vertically upright position.

10 Claims, 6 Drawing Sheets

MASON'S SCALE AND MASONRY GUIDE EMPLOYING SAID SCALE

INTRODUCTION

This invention relates to a device to assist in the laying of brick, and more particularly relates to a mason's scale and a masonry guide employing such a scale.

BACKGROUND OF THE INVENTION

Bricklayers (masons) frequeNtly use an aligning and leveling apparatus, located at the corner of a building to which brick is to be applied, to assist in aligning and leveling rows (courses) of bricks as they are applied, and also to ensure uniform thickness of mortar between each of bricks.

The apparatus used usually consists of a vertical pole member, having at each of its ends a means by which it may be affixed to a building. A measuring scale is frequently located on the vertical pole member of the apparatus, to assist the brick mason in providing a consistently uniform thicknesses of mortar between each of the courses of bricks as they are successively laid one on top of the other.

U.S. Pat. Nos. 2,672,691, 2,761,214, 2,832,143, 2,835,977, 3,017,701, 3,038,258, 3,096,588, 3,130,500, 3,127,688, 4,285,139, and 4,338,728 are examples of such apparati typically used by brick masons, each of which employs a measuring scale of one form or another on a vertical pole member.

As may be seen from the above-listed patents, it is known to provide the vertical pole member with a particular type of measurement scale, called a mason's scale. This scale may take two forms The first is a "modular" form, as shown in FIGS. 4 and 9 of U.S. Pat. No. 2,835,977. This scale does not show any absolute measurements, but alternatively provides delineations for the proper spacing of various-sized brick, such as roman brick (8 courses in 16" vertical inches), and engineered brick (5 courses in 16" vertical inches). By knowing the type of brick being used (say, for example, engineering brick), the mason may look to the scale which informs him that engineering brick is scale '5' on the scale, and accordingly for every line on the scale marked '5', the top of the next course of bricks must fall on such line on the scale.

Unfortunately, this type of scale does not provide the mason with the ability to adjust the spacing between the bricks, should he wish to do so, since it only provides a fixed pre-determined spacing distance between the bricks. A mason would wish to adjust the spacing between the bricks in a situation where, for example, say three-quarters of the way up the wall there was a sill of a window frame, and the mason wished to lay a whole number of courses between the base of the building and the sill of the window, and not end up with a fraction of a row of bricks. Accordingly, if on the standard spacing on the modular scale, it would require, say, 10 ½ rows of bricks, the mason would have to manually measure the width of the remaining ½ of the thickness of a brick, and calculate what 1/10 of such distance would amount to, and add that increment to each of the 10 layers of mortar, spaced between the respective courses of bricks, so that he would then end up with a whole number of courses of bricks (i.e. 10). This procedure is time consuming, and can often result in calculation errors which, when the mortar has been allowed to set and the error then discovered, are difficult to rectify.

A second type of mason's scale commonly used makes use of groups of calibrated lines (usually numbered from 0 to 9). Such a scale is clearly shown in FIG. 2 of the mason's guide disclosed in U.S. Pat. No. 3,038,258, and also in FIGS. 1 and 2 of U.S. Pat. No. 3,130,500. These types of scales may be used like the modular scale, wherein the mason determines the thickness of the brick and the first layer of mortar, and determines at which location (i.e. in layer between 0 and 9 on the scale) the resultant combination falls within the first group of integers, and hence forth lays and levels successive courses of brick at that particular integer each time that integer appears on the scale.

Alternatively, this type of scale may be used by the mason to determine the appropriate spacing to use between the courses of bricks for certain predetermined distances. Accordingly, if, for example, at a certain location on a wall to which courses of bricks are to be laid, say, for instance, at the lower most portion of a window sill, a mason wishes to have a whole integer number of rows of bricks, he may simply use this scale to measure the distance from the foundation of the structure to the base of the sill. Whatever integer number the base of the sill is level with on the scale is the integer that the mason will use for each other course of bricks so as to uniformly space the courses of bricks.

One difficulty with this type of scale, however, at distances greater that about 1 foot of vertical height, the individual groups of integers overlap with the preceding group of integers. Accordingly, it becomes difficult to read the scale. Another difficulty is that because of the selection of 10 integers, the physical space on the scale necessary to display these integers so that they can be read, at least on the first group of integers on the scale, is about ⅜" (see further discussion below). Accordingly this ⅜" is the variation in thickness of mortar between courses which results from using the first integer (1) on the scale, as opposed to the last integer (10) This may, if the larger of the two integers is selected rather than the smaller, produce an undesirable or unacceptable high (either for structural or aesthetic reasons) ratio of mortar to brick, since the mortar thickness would be whatever amount it was of the original brick-plus-mortar combination, plus the additional ⅜" if the last integer was selected.

SUMMARY OF THE INVENTION

In order to overcome the problems inherent in the previously-known mason's scales described above, and also the similar problems encountered in masonry guides incorporating such scales, the present invention provides for a colour-coded mason's scale and also for a particular masonry guide incorporating such a scale.

More particularly, the mason's scale of the present invention does away with all numbers, and provides, progressing from bottom to top of the scale, a plurality of groups of coloured bands, each band within each group of bands uniformly increasing in thickness towards the top of the scale.

As will be later more fully explained, the present invention by providing a scale with a group of coloured bands, wherein any mortar-and-brick combination falling within one of those bands within each group will have a desired mortar-thickness-to-brick thickness ratio, allows a mason prior to laying any bricks, to predetermine what spacing distance (i.e. what mortar and brick thickness) to be used so as to end up with a whole number of courses of bricks within a given distance. He may do this simply by looking to see within which coloured band a certain location, such as the edge of a window sill in a wall which is to be cased with bricks, would fall, and thenceforth lay the courses of brick so that the top of each course of brick is level with that particular point on the associated band on the scale.

By providing a mason's scale of the design of the present invention, all previously necessary steps of having to calculate the required thickness increase or decrease to the mortar thickness between courses of bricks, so as to end up with a whole number of courses of bricks within a given interval, as was necessary with simple measuring scales, is eliminated.

Moreover, by providing a colour band scheme, rather than a numbering scheme, the desired levels for the courses of bricks may be more quickly discerned, rather than having to closely inspect the scale to determine which integer is to be used.

Accordingly, in one of its broad aspects, the mason's scale of the present invention comprises a plurality of groups of mutually adjacent, individually coloured bands arranged along a substantially elongate flat surface, each group spaced a progressively decreasing distance apart from the next group progressing from bottom to tip of said scale; the colour, number, and arrangement of said bands within one of said groups of bands being identical to the colour, number, and arrangement of said bands within all other of said groups of bands; the width of each band within said groups of bands uniformly increasing from one group of bands to the next progressing from bottom to top of said scale; and each midpoint of each coloured band spaced a uniform distance from the midpoint of a correspondingly coloured band in an adjacent group of coloured bands.

Of note, it is not strictly necessary that the mason's scale of the present invention have a group of coloured bands-one coloured band could suffice. Such band would uniformly increase in width, progressing from bottom to top of the scale, as do the groups of bands. However, since near the top of the scale, the single bands would necessarily be close together, reading of the scale would be much more difficult. More importantly, however, with a single large band, rather than a plurality of smaller bands, it is necessary to estimate to a greater extent precisely where within such band a desired point would be. Accordingly, it has been found that it is preferable to use a plurality of coloured bands to reduce these errors, and preferably at least 3 individually coloured bands.

Theoretically 10 or more different coloured bands could be used, but then the physical space necessary on the scale to display such coloured bands in the first group of bands likely would be greater, likely around ⅜". This would thereby cause successive groups of bands to increase in incremental steps of ⅜", and within about 4 or 5 groups, (i.e. about 12" of vertical height) there would not appear on the scale any separating gap between the groups of coloured bands. This would render the scale unworkable in the manner described herein for vertical distances of greater than about 12–14 inches.

Accordingly, it has been found that for bricks of ordinary thickness most commonly used (i.e. engineering bricks, which are, when laid, around 82 mm or 3.2 inches in thickness, including mortar thickness of about 10 mm) a mason's scale having 3 separately coloured bands provides the mason with sufficient capability to estimate a particular location within a coloured band which is to be used as the reference for each course of brick (see further discussion below) yet there are not so many groups of coloured bands so as to render the scale impractical for the reasons previously described.

Masons generally prefer a mason's scale to be of at least 7 feet in length, as this dimension is generally the dimension within which adjustments to mortar thickness will be made, since it is generally the height between floors on a building. It is also the dimension within which all protuberances on a structure, such as window sills, vents, door frames, and the like, will generally fall within, which may necessitate recalculation of mortar thicknesses to arrive at whole numbers of courses of bricks at such protuberances.

Accordingly, in a preferred embodiment, in order to avoid the groups of 3 coloured bands overlapping each other within this approximate 7 feet length of the scale, it has been found that it is preferable that each band in each group of coloured bands increase in thickness a very small incremental amount progressing from bottom to top of the scale.

In a preferred embodiment of the colour-coded scale of the present invention, each band within each group of bands increases in width approximately one millimeter progressing from one group of bands to another, from bottom to top of the scale. The spacing between the midpoint of each band within a group of bands and the corresponding band in the next group of coloured bands is fixed, and where 3 bands are used, is preferably set at approximately 81 mm, 82 mm, and 83 mm respectively. With such dimensions, if the scale commences with a coloured-coded group of bands of nominal thickness (say 1 mm each in thickness), within a 7 feet scale length approximately 27 groups of coloured bands may be provided within such 7 feet scale length.

Using the approximate 7 ft. length of scale, commencing with a thickness of 1 mm for each band within each group of bands, and thereafter increasing each band within each group of bands by 1 mm, progressing from bottom to top of the scale, so that each group of bands increases by 3 mm from one group of bands to the next, at the 27the group of coloured bands, such group will have a width of 81 mm.

In order to effectively utilize the mason's scale of the present invention, it is contemplated that the mason's scale as above-described be employed in a masonry guide.

Accordingly, the present invention also provides a masonry guide employing the above-described mason's scale (scale means), which is affixable to the exterior or interior of a structure to allow for laying corners and straight courses of bricks on such structure.

More particularly, in one broad aspect, a masonry guide is provided, comprising (1) an elongate post member; (2) bracket means affixed at each end of the post member and extending substantially perpendicularly outwardly therefrom for affixing the post member in a vertical upright position to the exterior of the structure, and; (3) scale means comprising a masonry guide for laying corners and straight courses of bricks on the exterior or interior of a structure, comprising an elongate flat surface aligned adjacent and parallel to said post member, having thereon a plurality of groups of mutually adjacent, individually coloured bands, each group of bands spaced a progressively decreasing distance apart from the next group progressing from bottom to top of said scale means, the colour, number and arrangement of said bands within one of said groups of bands being identical to the colour, number, and arrangement of said bands within all other of said groups of bands, the width of each band within said groups of bands uniformly increasing from one group of bands to the next progressing from bottom to top of said scale means, each midpoint of each coloured band within each group of bands spaced a uniform distance from the midpoint of a correspondingly coloured band in an adjacent group of coloured bands.

In a preferred embodiment of the invention, the scale means is made vertically slidably adjustable relative to the scale means, in order to allow for more precise positioning of the scale in alignment with the courses of bricks. Accordingly, the pole member is further provided with adjustment means for adjustable positioning of the scale means relative to the pole member in a direction parallel to a longitudinal axis of the pole member to produce this result.

The above feature provides a great advantage since the position of the scale means is not strictly dependant on the original position of affixation of the masonry guide to the structure. Accordingly, if the scale is desired to be moved vertically, it may simply be slidable adjusted, rather than having to be removed, and reattached to the structure, as was necessary in such prior art devices as disclosed in U.S. Pat. No. 3,130,500. This feature is particularly useful in the context of the masonry scale of the present invention if, for example, a window sill or some other reference point was to lie between one group of bands and another on the scale means, making alignment of the courses of bricks impossible with the masonry scale of the present invention. By vertical slidable adjustment of the scale means, the scale means may be vertically slidably positioned so that the reference point may lie within one group of coloured bands. Accordingly, the mortar thickness between the bricks, and the spacing of the courses of bricks may then be determined from the scale once aligned in this manner.

In a further preferred embodiment of the masonry guide of the present invention, slidable guide-line holding means are further provided. These guide-line holding means are made slidable along the scale means, and allow alignment of a guide-line with a desired location within a coloured band on the scale means. Accordingly, a course of bricks may be then levelled to such height, and. each brick made level by aligning the top thereof with the guide-line attached to the guide-line holder.

In operation, the masonry guide of the present invention is firstly attached to a structure to be cased in brick, in a vertical orientation. This is done via bracket means provided at each end of the post member of the masonry guide.

The scale means on the masonry guide may then be slidably positioned so that the base of the scale means rests on or is level with the foundation of the structure. The mason may then arbitrarily (or in accordance with an accepted or specified industry standard) select a spacing distance between courses of bricks by selecting a coloured band or the scale within the group of bands closest the foundation of the structure, and then aligning the guide-line holders with a particular location within the coloured band on the scale means. The first course of bricks may then be laid by aligning and levelling them to the height of guide-line. Once such course of bricks is laid, the slidable guide-line holders may then be realigned with the next corresponding coloured band on the scale means, in the identical estimated position within such coloured band as was used originally, and the next course of bricks may be laid. Successive courses of bricks may be laid in a similar manner.

Alternatively, the mason may, before laying any courses of bricks, decide to determine an optimal spacing between courses of bricks by using the scale means. For example, if at a certain level on the structure the mason wishes to end up with a whole number of courses of bricks, instead of a fraction of a course of bricks, he may simply look to the scale means to see at which location within a coloured band within a group of coloured bands such reference point lies. If the desired point lies between two groups of coloured bands, he may slidably adjust the scale means until the reference point falls within one or other of a group of coloured bands, using the adjustment means referred to above). Then, the mason may align the slidable guide-line holders with the corresponding position on a coloured band within the lowermost group of coloured bands on the scale, and commence the laying of the first course of bricks. This he may do by aligning and levelling them with the guide-line which extends from the guide-line holder of a first mason's guide to a similarly-positioned second masonry guide. Successive courses of bricks are laid by then moving the slidable guide-line holder up to the next corresponding position within the next group of coloured bands on each scale.

This procedure will be repeated by the mason until the courses of brick reach the reference point, which will be arrived at with a whole number of courses of bricks. Courses of brick may thereafter continue to be laid at the same spacing distance, until the end of the scale, or until the desired height of the bricks is reached, whichever occurs first.

The following drawings referred to below describe the invention in its preferred embodiments, but the invention is not to be limited to such preferred embodiments.

DETAILED DESCRIPTION OF THE PREFERRED EMBODIMENTS

Figure 4:
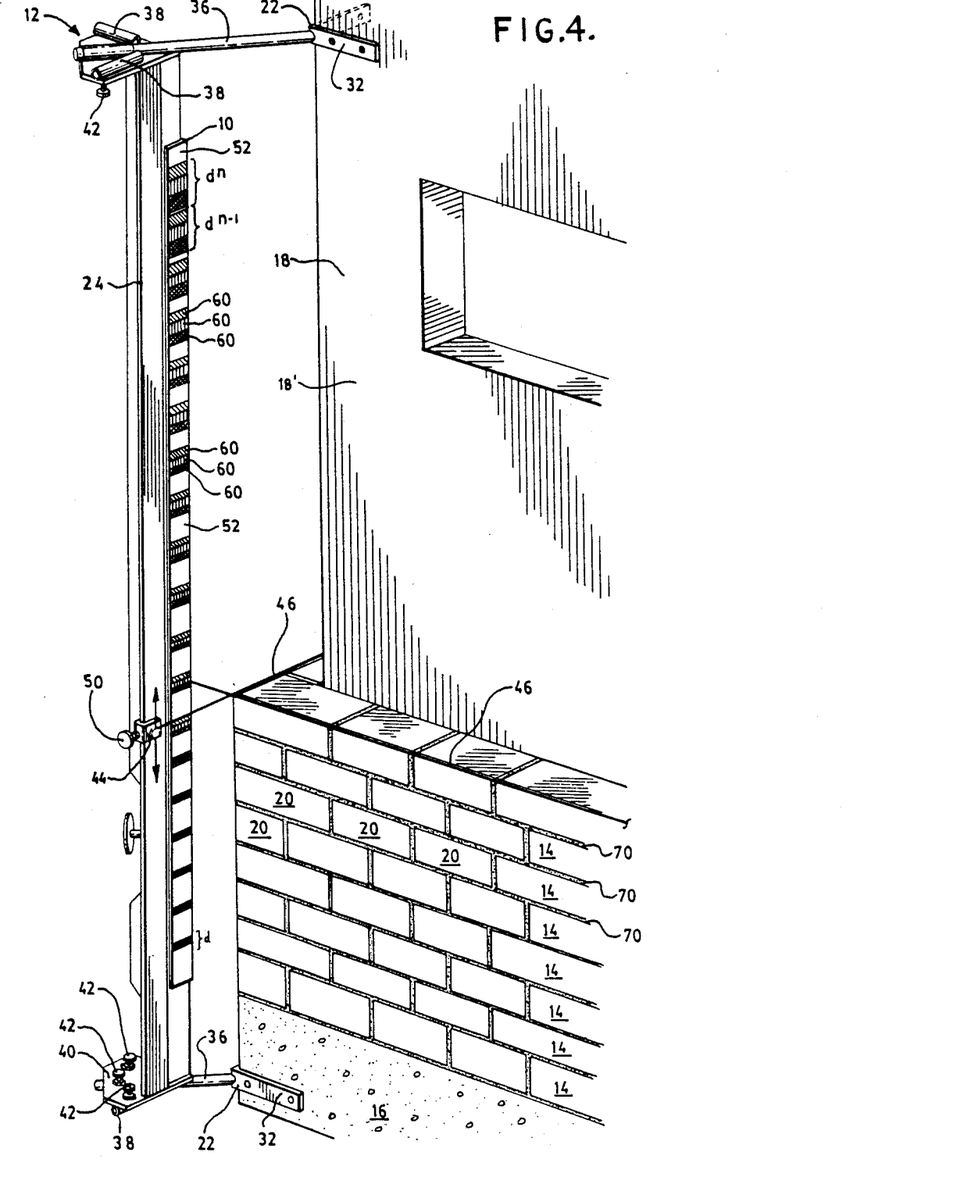
FIG. 4 is a perspective view of a first embodiment of the masonry guide of the present invention incorporating the mason's scale of the present invention, having end brackets to allow affixation to an exterior wall of a structure.
Figure 5:
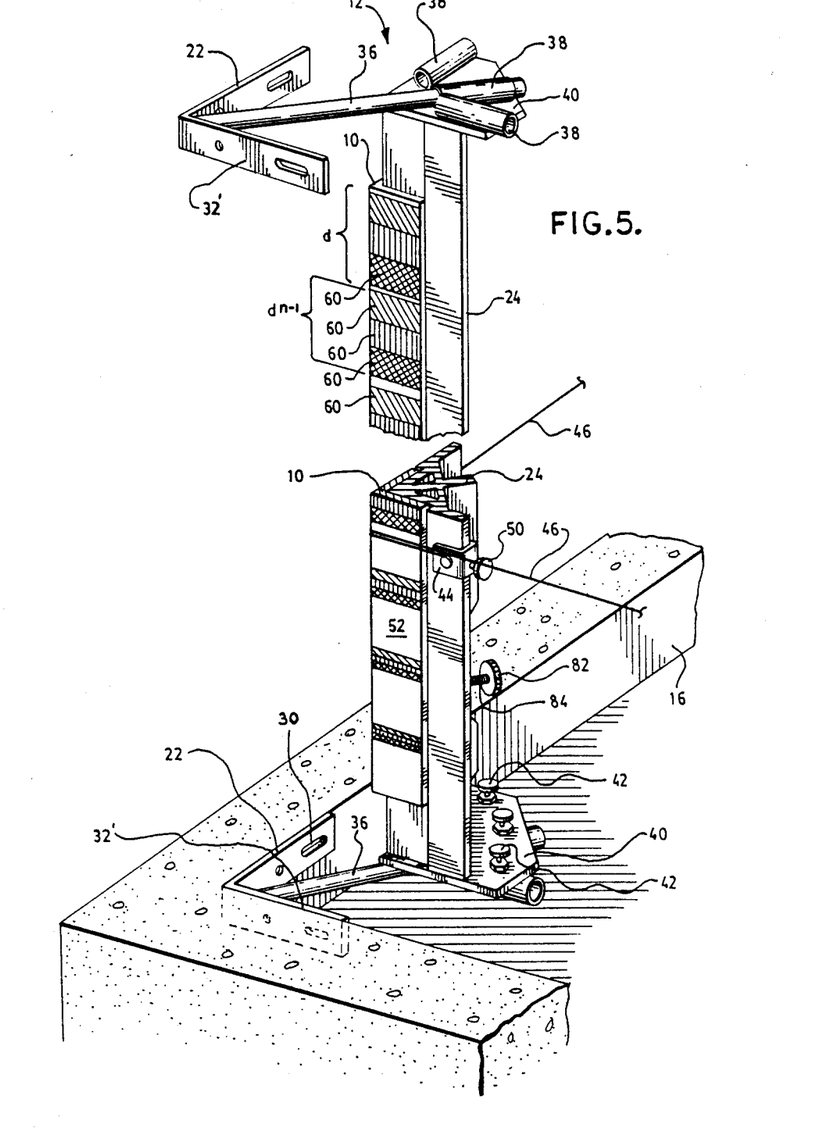
FIG. 5 is a perspective view of a second embodiment of the masonry guide of the present invention incorporating the mason's scale of the present invention, having end brackets to allow affixation to an interior wall of a structure.

FIGS. 4 and 5 of the drawings show a mason's scale (scale means) 10 of the present invention, incorporated into a masonry or mason's guide 12. The mason's scale 10 and mason's guide 12 are together used in pairs to lay courses 14 of bricks 20 on a foundation 16 of a structure 18, to form a brick wall casing 20 about the structure 18.

FIG. 4 shows a first embodiment of the mason's guide 12 of the present invention, having bracket means 22 mounted at opposite ends of a post member 24 to allow affixation of the mason's guide 12 to an exterior wall 18' and foundation 16 of the structure 18, to allow the exterior wall 18' to be cased in brick 20.

FIG. 5 shows a second embodiment of the mason's guide 12 of the present invention, having top and bottom bracket means 22 affixed at respective end of the post member 24 to allow respective affixation of the mason's guide 12 to an interior wall (not shown) and the foundation 16 of a structure, to allow the interior wall of the structure to be cased in brick.

Each of the bracket means 22 in both the first and second embodiments of the mason's guide 10 extend substantially perpendicularly outwardly from the post member 24, and allow the mason's guide 10 to be affixed in a vertically upright position to the structure 18, by means of bolts or screws passing through apertures 30 therein.

Each of the bracket means 22 may comprise a substantially 90° 'V'-shaped member 32, which may be either an outwardly extending 'V'-shape, as shown in FIG. 4, adapted to be fitted and secured onto a 90° exterior corner of a structure 18, as shown in FIG. 4, or alternatively may be an inwardly extending 'V'-shaped member 32', as shown in FIG. 5, adapted to be fitted and secured into a 90° interior corner of a structure 18, as also shown in FIG. 5. Alternatively, the bracket means 22 may be flat, to allow the post member 24 to be affixed to a flat wall surface of a structure 18 (not shown).

Where the bracket means 22 has V-shaped members, each of the V-shaped members 32, 32' are secured to an elongate member 36, which is in turn slidably positionable within a selected one of one or more receptacle members 38. The receptacle member(s) 38 are mounted on a flat member 40, which is mounted at each of opposite ends of the post member 24.

Advantageously, the receptacle members 38 of the present invention, each having their own threaded locking screw 42 which may be rotated to contact and thereby temporarily secure the elongated member 36 of a bracket means 22 therein, allow for interchangeability of various bracket members 22 therein. More particularly, the 90° V-shaped member 32 as shown in FIG. 4 may easily be slidably disengaged from a particular tubular receptacle member 38, and another bracket member 22, such as the 90° inwardly extending V-shaped member 32' of FIG. 5, or another bracket member 22 having a 0° flat member 32'' (not shown) may be inserted and locked therein by means of the locking screw 42, to allow the mason's guide 12 to be vertically secured to a structure 18 having a different configuration than that shown in FIG. 4.

Moreover, where a plurality of receptacle members 38 are provided, the bracket means 22 may be inserted in the particular receptacle members 38 at the respective ends of the post member 24 which most easily allow the masonry guide 12 to be aligned in vertical position on the structure. This is of particular advantage where maneuverability of the mason's guide 12 is restricted due to other structures located nearby.

Figure 7:
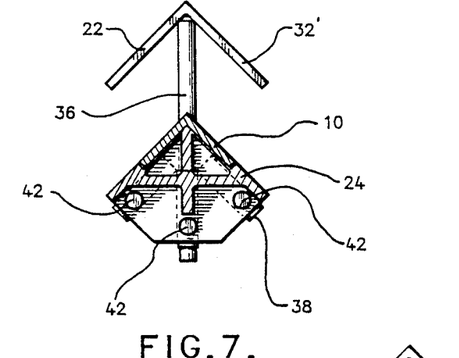
FIG. 7 is a cross-sectional view taken along plane 7—7 of FIG. 6.
Figure 8:
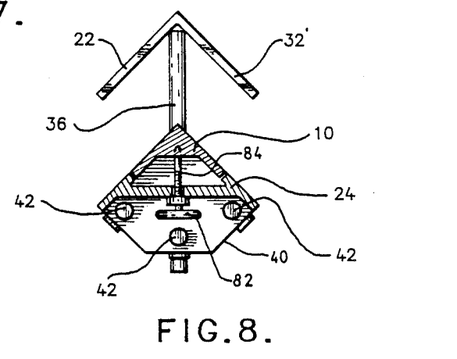
FIG. 8 is a cross-sectional view taken along plane 8—8 of FIG. 6.

The post member 24 of the masonry (mason's) guide 12 is preferably of a 'V' shaped configuration in cross-section, as shown in FIGS. 7 and 8. Such post member 24 may have slidably affixed to it two slidable guide-line holders 44. Each of such guide-line holders 44 may have secured to them a guide-line 46. The guide-line holders 44 may be temporarily affixed in place on the post member 24 by means of a threaded locking screw 50, as shown in FIGS. 4 and 5.

Figure 2:
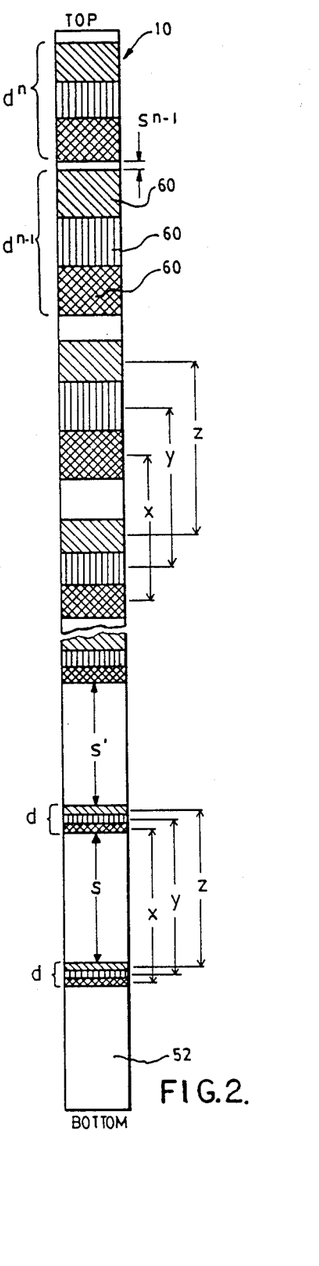
FIG. 2 is a plan view of the mason's scale of the present invention.
Figure 2A:
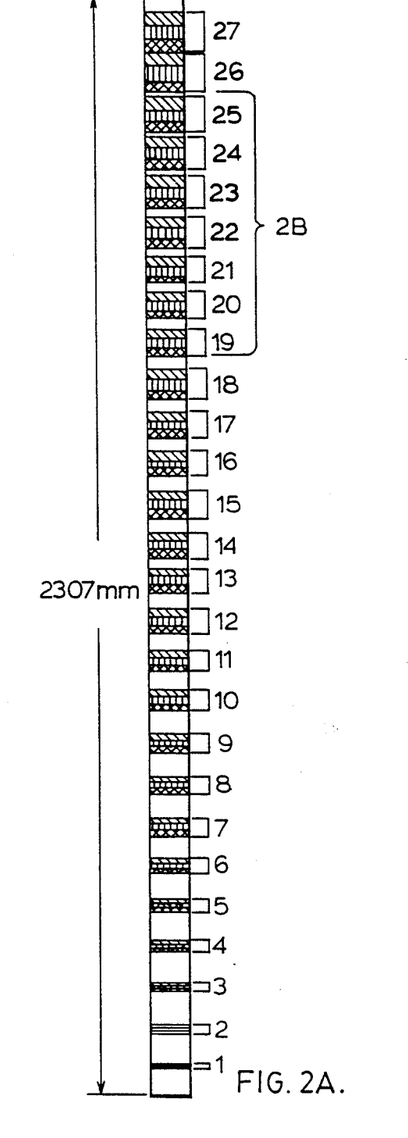
FIG. 2A is a side elevation view of the scale means of the present invention, in a preferred embodiment thereof.
Figure 2B:
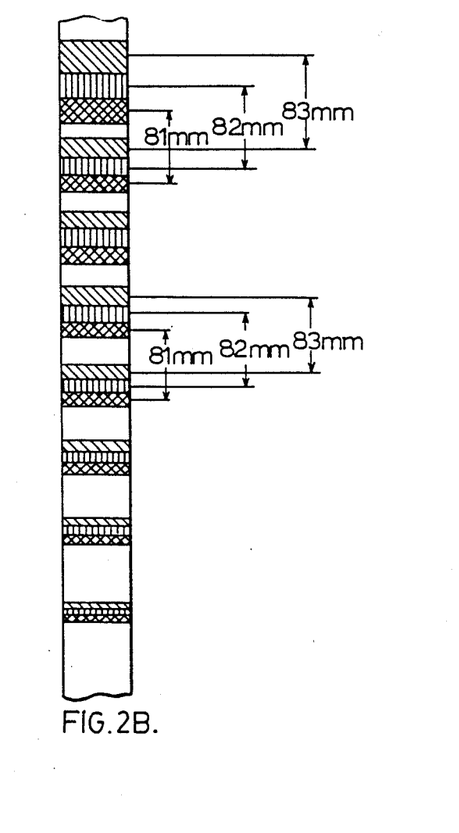
FIG. 2B is an enlarged view of the area of the scale means encircled in FIG. 2A.

Unique to the masonry guide 12 of the present invention is a unique mason's scale (scale means) 10, as shown in FIGS. 4 and 5, but shown most clearly in FIGS. 2, 2A and 2B.

Such scale means 10 comprises at least one elongate flat surface 52, which when incorporated into the masonry scale 12 of the present invention, is aligned adjacent and parallel to the post member 24, at the apex of the V-shaped post member 24.

In the embodiment shown in FIGS. 4 and 5, the scale means 10 is substantially 'V' shaped, the apex of which being co-linear with the apex of the V-shaped post member 24.

As may be seen from FIG. 2, 2A and 2B, a plurality of groups (d, d' ... $D^{n-1}$, $d^n$) of three mutually adjacent, individually coloured bands 60 are arranged along the at least one substantially flat surface 52 of the scale means 10, and each group d, d' ... $d^{n-1}$, $d^n$ is spaced a progressively decreasing distances, s, s' ... $S^{n-1}$ distance apart from the next group, progressing from bottom to top of the scale means 10 (see FIG. 2).

The colour and arrangement of the three coloured bands 60 within each group d, d' ... $d^{n-1}$, $d^n$ of coloured bands is identical, with the width of each band 60 uniformly increasing from one group of bands 60 to the next, progressing from bottom to top of the mason's scale 10.

Each midpoint of each coloured band is spaced a uniform distance x, y, or z from the respective midpoint of a correspondingly coloured band 60 in an adjacent group of coloured bands 60 (see FIG. 2). Distance x is naturally less than distance y, and distance y is accordingly less than distance z.

In a preferred embodiment of the invention, where engineering brick is contemplated as being used, the dimensions x, y, and z on the scale means 10 shown in FIGS. 2, 2A and 2B are preferably fixed at 81 mm, 82 mm, and 83 mm respectively.

The bands in each group of bands commence with a width of 1 mm, and increase in thickness by 1 mm combined width of the 3 coloured bands increases from 3 mm up to a total of 81 mm at the 27th group of bands.

Figure 1:
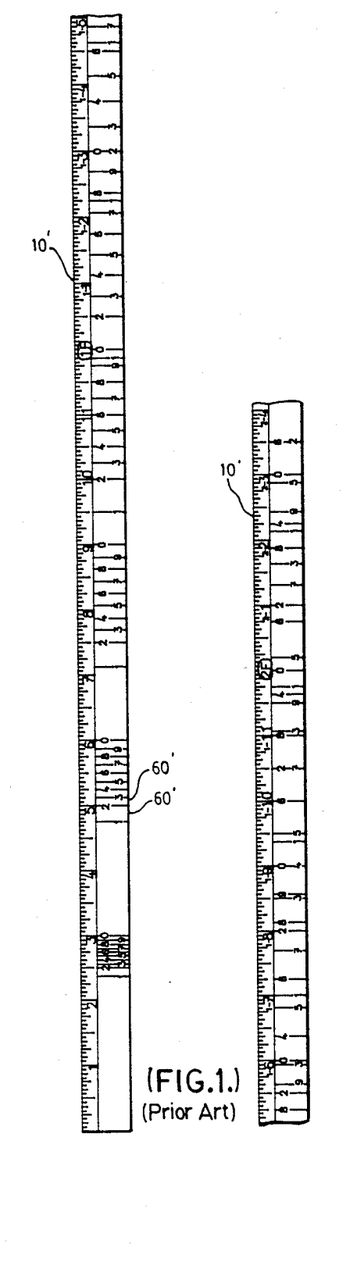
FIG. 1 is a plan view of a typical mason's scale of the prior art.

A mason's scale 10 as described above possesses a number of significant advantages over the most relevant mason's scales 10' currently available on the market. Most particularly, a representative sample 10' of such prior art mason's scales currently available is shown in FIG. 1. Such representative sample 10', manufactured by Cooper Tools, a Division of Cooper Industries under the trademark Lufkin[1] is typical of the integer-type mason's scales 10' earlier described under the Background of the Invention. As may be seen from FIG. 1, the groups of Invention. As may be seen from FIG. 1, the groups of numbered bands 0–9 very quickly increase in width, and within a distance of slightly greater than 12 inches, overlap with each other. This makes reading of the scale 10' difficult in distances over one foot. Also, the overlapping of the groups of bands 60' prevents use of the scale 10' in the manner herein disclosed where groups of coloured bands are employed, as it would be physically impossible to read a coloured-coded scale 10 if the colour-coded bands 60 overlapped.

1. Trademark of Cooper Tools, A Division of Cooper Industries

Figure 3:
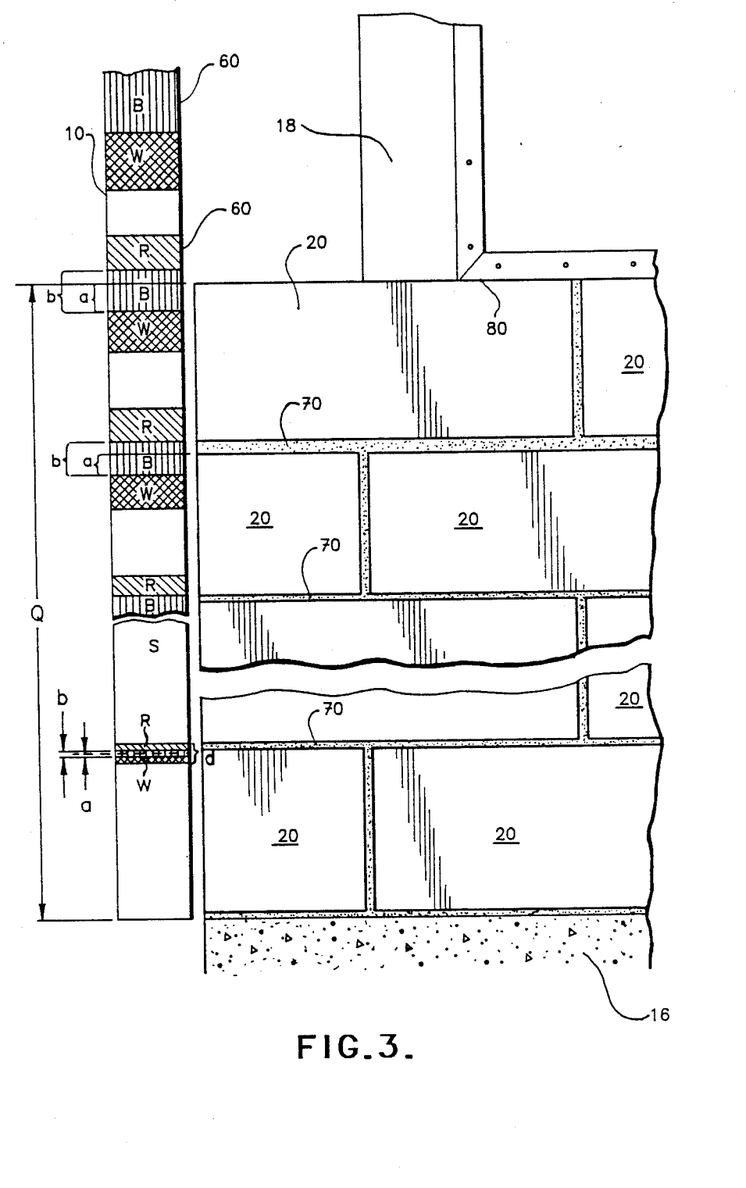
FIG. 3 is a side elevation view of a partially-constructed brick wall, showing how the mason's scale of the present invention is to be used.

FIG. 3 shows the intended manner of operation of the colour-coded scale means 10 of the present invention. More particularly, the scale means 10, consisting of groups 'd' of three coloured bands 60 (B-blue, R-red, and W-white) is placed proximate a structure 18 against which courses 14 of bricks 20 are to be laid, with the bottom of the scale 10 abutting or level with the foundation 16 of the structure 18.

If, for example, the top of a first course 14 of bricks 20 is level with, or is desired to be level with a height that appears on the scale means 10, such height appearing on the scale at the fraction a/b of the width of the blue band 60(B), then each successive course 14 of brick 20 may be levelled by the mason so as to fall at the location on the scale 10 which is the fraction a/b of the width of the corresponding coloured blue band 60(B) on the scale 10 adjacent such course 14 of brick 20 (see FIG. 3).

Alternatively, if the mason wishes to quickly adjust the height of the mortar 70 between courses 14 of brick 20 so as to arrive at a whole number of courses 14 of bricks 20 at a certain height on the structure 18, say, for example, at a window sill 80 at a height 'Q' above the foundation 16, as shown in FIG. 3, the mason may simply look across to the mason's scale 10 of the present invention to see at which location within a coloured band 60 such height would be. If, for example, such reference point lies at the fraction a/b of the width of coloured band 60B, within the group of coloured bands d''', then each course of brick 20 would be levelled, commencing from the foundation at the position a/b of the width of the respective coloured band 60 for the group d, and thereafter for each group d', d'' etc up to the window sill, and thereafter for each group up to d$^n$. In such manner, the courses 14 of bricks 20 will be uniformly spaced apart by equal distances of mortar 70.

Figure 6:
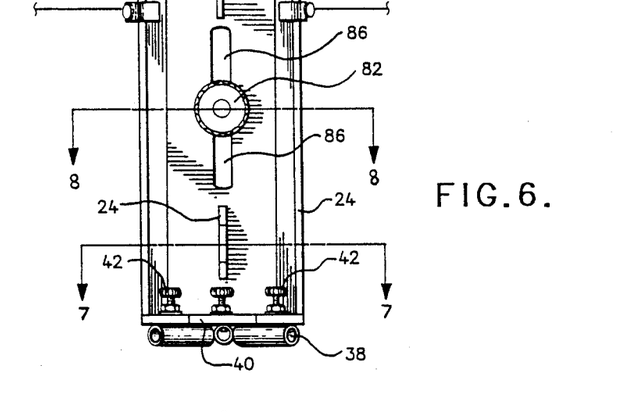
FIG. 6 is a rear view of the lower portion of the post member of FIG. 5.

With reference to the mason's guide 12 of the present invention, to allow the mason's scale 10 to be vertically slidable relative to the post member 24, as may clearly seen from FIGS. 6 and 8 a knob 82 having a threaded stem 84, which is slidable in a slot 86 within the post member 24 is provided to allow the scale means 10 to be slidable. The knob 82 may be rotated to tighten the scale means 10 against the post member 24 to prevent unintended slidable displacement of the scale 10 relative to the post member 24.

In the preferred embodiment of the invention, the scale means 10 is channel-shaped, having two substantially flat side surfaces forming an approximate 90° angle with each other, as may be clearly seen in the cross-sectional FIGS. 7 and 8. Such channel-shaped scale means 10 is then able to matingly engage the channel-shaped post member 24, when such post member 24 is similarly constructed as shown in FIGS. 5, 7 and 8.

Although the disclosure describes preferred embodiments of the invention, the invention is not to be so limited. Other embodiments and variations may now be apparent to those skilled in the art. For a complete reference to the scope of the invention, reference is to be had to the appended claims.

I claim:

1. A mason's scale for use in laying courses of bricks, comprising:

a plurality of groups of mutually adjacent, individually coloured bands arranged along a substantially elongate, flat surface, each group spaced a progressively decreasing distance apart from the next group progressing from bottom to top of said scale;

the colour, number, and arrangement of said bands within one of said groups of bands being identical to the colour, number, and arrangement of said bands within all other of said groups of bands;

the width of each band within said groups of bands uniformly increasing from one group of bands to the next group of bands progressing from bottom to top of said scale; and each midpoint of each coloured band spaced a uniform distance from the midpoint of a correspondingly coloured band in an adjacent group of coloured bands.

2. The mason's scale as claimed in claim 1, wherein each group of mutually adjacent coloured bands consists of a group of 3 coloured bands.

3. The mason's scale as claimed in claim 2, wherein each band within each of said groups of bands increases by approximately one millimeter in width progressing from one group of bands to another from bottom to top of said scale.

4. The mason's scale as claimed in claim 3, wherein said scale is at least 7 feet (2.13 m) in length.

5. The mason's scale as claimed in claim 4, wherein the midpoint of each band within said group of three bands is uniformly spaced approximately 81 millimeters, 82 millimeters, and 83 millimeters respectively from the midpoint of such corresponding band in the next group of coloured bands.

6. The mason's scale as claimed in claim 5, said scale comprising at least 27 groups of bands.

7. A masonry guide for laying corners and straight courses of bricks on the exterior or interior of a structure, comprising:

an elongate post member;

bracket means affixed at each end of said post member and extending substantially perpendicularly outwardly therefrom for affixing said post member in a vertical upright position to said structure; and scale means comprising an elongate flat surface aligned adjacent and parallel to said post member, having thereon a plurality of groups of mutually adjacent, individually coloured bands, each group of bands spaced a progressively decreasing distance apart from the next group progressing from bottom to top of said scale means, the colour, number and arrangement of said bands within one of said groups of bands being identical to the colour, number, and arrangement of said bands within all other of said groups of bands, the width of each band within said groups of bands uniformly increasing from one group of bands to the next progressing from bottom to top of said scale means, each midpoint of each coloured band within each group of bands spaced a uniform distance from the midpoint of a correspondingly coloured band in an adjacent group of coloured bands.

8. The masonry guide as claimed in claim 7, said post member further comprising adjustment means for adjustable positioning of said scale means relative to said post member in a direction parallel to a longitudinal axis of said post member.

9. The masonry guide as claimed in claim 8, further comprising slidable guide-line holding means, slidable along said scale means, to allow alignment of a course of bricks with a desired location within a coloured band on said scale means.

10. The mason's guide as claimed in claim 7, wherein each group of mutually adjacent coloured bands consists of a group of 3 coloured bands.

* * * * *